United States Patent [19]

Hamermesh

[11] Patent Number: 4,476,256

[45] Date of Patent: Oct. 9, 1984

[54] FRICTION MATERIAL FOR BRAKE LININGS AND THE LIKE

[75] Inventor: Charles L. Hamermesh, Westlake Village, Calif.

[73] Assignee: Rockwell International Corporation, El Segundo, Calif.

[21] Appl. No.: 573,261

[22] Filed: Jan. 23, 1984

[51] Int. Cl.³ .......................... C08K 3/34; C08K 3/10; C08K 3/04

[52] U.S. Cl. .................................. 523/152; 523/153; 523/155; 523/156; 524/440; 524/443; 524/597

[58] Field of Search ................ 523/152, 153, 155, 156

[56] References Cited

U.S. PATENT DOCUMENTS

| | | | |
|---|---|---|---|
| 4,371,631 | 2/1983 | Peters | 523/156 |
| 4,374,059 | 2/1983 | Wagner | 523/153 |
| 4,384,054 | 5/1983 | Moraw et al. | 523/155 |
| 4,388,423 | 6/1983 | Kaufman et al. | 523/153 |

Primary Examiner—Lewis T. Jacobs
Attorney, Agent, or Firm—H. Fredrick Hamann; Craig O. Malin

[57] ABSTRACT

A friction material for brake linings is formed using a polystilbazole resin (3–16% by weight) to provide the matrix for the material. The balance of the material is filler material such as steel wool, metal powders, carbon, ceramic powders, and friction modifiers. The lining is produced by mixing the ingredients and hot pressing the mixture at temperatures which promote the flow and cure of the resin, and at pressures which produce a material of suitable density.

12 Claims, No Drawings

FRICTION MATERIAL FOR BRAKE LININGS AND THE LIKE

BACKGROUND OF THE INVENTION

This invention relates to the field of friction materials and particularly to friction materials for brake linings, clutches, and the like.

Brakes for vehicles utilize a stationary member which is pressed against a rotating member. Friction between the stationary and rotating members converts the mechanical energy of the vehicle into heat. In order to provide good wear resistance and a suitable coefficient of friction between the two members, a lining is attached to the stationary member.

Brake linings are grouped into three classes based upon their materials of construction, namely high temperature organic material linings, sintered friction material linings (metallic linings), and semimetallic material linings. The high temperature organic material linings and the semi-metallic lining are widely used in automobile and truck brakes. These linings consist of filler materials bonded together in a matrix of natural or synthetic binders and resins such as polymer of cashew nut shell liquid, rubber, asphaltic base materials, and phenolic resin. The filler materials include reinforcement fibers such as asbestos, glass fibers, cotton, and steel wool. Heat absorbers such as iron and copper powder, and friction modifiers such as barytes, graphite, alumina, and mineral powders are generally included in the filler material to provide the coefficient of friction, wear resistance, and temperature capability required for specific applications.

The synthetic resins commonly employed for the matrix of brake linings are the phenolics. The phenolics have high temperature stability and yield a substantial quantity (ca. 50% of initial weight) of strong char. In addition, they are among the least expensive of the high temperature matrix materials. However, there is a continuing need to improve the high temperature capability of brake linings. This is particularly true for disc brakes which are replacing drum brakes in many automotive applications, and for truck brakes which encounter very high operating temperatures under certain driving conditions. Additionally, there is a continuing need to increase the life of brake linings in order to avoid the expense and down-time required to replace brake linings.

SUMMARY OF THE INVENTION

It is an object of the invention to provide a improved brake lining.

It is an object of the invention to provide a brake lining with improved high temperature capability.

It is an object of the invention to provide a brake lining with improved wear resistance.

It is an object of the invention to provide a brake lining with improved fade resistance.

According to the invention, a polystilbazole resin (3–16% by weight) is used for the matrix of the brake lining material. The balance of the brake lining material is filler material selected to provide suitable wear resistance, coefficient of resistance, and temperature capability for specific applications.

In a preferred embodiment, the polystilbazole resin used for the matrix is polystyryl pyridine (PSP). This material has a high char yield (ca 70% of initial weight) and provides good high temperature stability.

In a second preferred embodiment the polystilbazole is addition curing polystyryl pyridine (APSP). This material has properties similar to PSP, but it does not produce gaseous by-products during curing. Consequently, it is easier to fabricate and is more forgiving of inadequate curing ("green" lining) when exposed to service conditions.

The balance of the lining material in both preferred embodiments is filler material consisting of steel wool, metal powders, carbon (graphite and/or carbon black), ceramic powders, and friction modifiers.

The brake lining material is fabricated by mixing the polystilbazole resin and the filler materials and placing the mixture in a mold. The mixture is then hot pressed at temperatures which promote flow and cure of the resin. Sufficient pressure is applied to provide the finished material with a suitable density.

DESCRIPTION OF THE PREFERRED EMBODIMENT

Different percentages of polystyryl pyridine (PSP) and of addition curing polystyryl pyridine (APSP) were combined with various filler materials and processed to provide a semi-metallic brake lining. PSP and APSP are polystilbazole resin polymers. Formation of the PSP polymer is described in U.S. Pat. No. 3,994,862. Formation of the APSP polymer is described in U.S. Pat. No. 4,362,860. As described in the patents, both these polymers have high char yields. The PSP polymer is cured by a condensation reaction which produces PSP and water. The APSP polymer avoids the production of water during the final cure by first forming a prepolymer using a condensation reaction and then curing the prepolymer by an addition reaction.

Samples of brake lining materials were fabricated using both PSP polymer and APSP polymer for the matrix-forming resin constituent. Various filler compositions were used to provide an asbestos-free, semi-metallic type lining. For comparison purposes, samples having a similar filler composition were also fabricated using phenolic resins to form the matrix in accordance with prior art practice.

Samples were evaluated using a brake screening test commonly referred to as the Chase test. This is a Society of Automobile Engineers Recommended Practice identified as "Brake Lining Quality Control Test Procedure—SAE J661a". A composition which showed promise based upon the Chase test was riveted to brake shoes and tested on a full-scale inertia dynamometer. These tests showed that PSP and APSP resins could be used to form the matrix of semi-metallic brake linings having improved high temperature performance. The amount of resin used and the composition of filler materials can be selected on the basis of dynamometer testing and actual use to optimize the composition for particular applications.

The following are examples of methods and compositions which can be used to prepare brake linings according to the invention. Also included for comparison is an example (Examples I–III) of a brake lining made using a prior art matrix (phenolic resin).

EXAMPLE I

Phenolic Resin Matrix (Prior Art Matrix)

The following filler materials (in weight %) were dry mixed: 18% graphite, 34.7% steel wool, 5% alumina, 22% iron powder, and 12% barytes. The matrix or binder was 10% of a phenolic resin (Monsanto SC1008) which was sprayed onto the dry mixture as a dilute solution with an appropriate solvent. Approximately 225 g of the formulation was placed in a mold and hot pressed to consolidate and cure the mixture. The cure cycle was: apply 9000 psi pressure, heat to 350 degrees F. in 1 hour (bumping twice at 212 F.), hold at 350 degrees F. for 1 hour, cool to room temperature within 1 hour, and release pressure. The cured sample was removed from the mold. It was approximately ⅜" thick and had a density of 3.58 g/cc, equal to the theoretical density of the formulation. The sample was run on the Chase test and it performance was rated as "good".

EXAMPLE II

Phenolic Resin Matrix (Prior Art Matrix)

A sample was fabricated using the same composition as for Example I except that a post cure treatment of 13 hours at 350 F. was added after the pressure cycle. The sample had the same density and Chase performance rating as the sample for Example I.

EXAMPLE III

Phenolic Resin Matrix (Prior Art Matrix)

A sample was fabricated using the same composition and cure cycle as for Example II except that the pressure used was only 3000 psi rather than 9000 psi. The cured sample had a density of 91% of theoretical. Its Chase performance was rated "poor", thus indicating that higher densities are required to obtain "good" Chase performance.

EXAMPLE IV

PSP Resin Matrix

A sample was fabricated using the same composition as for Example I except that 10% PSP was used as the matrix material rather than phenolic, and it was sprayed on to the filler material from solution. The cure cycle was 9000 psi and a maximum temperature of 480 degrees F. After hot pressing the sample was post cured 4 hours at 480 degrees F. Density was 3.94 g/cc which is higher than theoretical (3.58 g/cc) because of resin loss during hot pressing. Resin cure needs to be advanced before pressure is applied to minimize resin loss. The Chase performance was rated "good".

EXAMPLE V

APSP Resin Matrix

A sample was fabricated using the same composition as for Example I except that 10% APSP was used as the matrix material rather than phenolic, and it was added to the filler material as a dry powder. The hot pressing cycle was 275 degrees F. for 1 hour and 350 degrees F. for 4 hours at 9000 psi. After hot pressing the sample was post cured at 480 degrees F. for 4 hours. The resulting density was 94% of theoretical and the Chase performance was rated "very good".

EXAMPLE VI

APSP Resin Matrix

A sample was fabricated using the same composition and hot pressing cycle as for Example V. However, the APSP resin was dissolved or dispersed in THF solvent and sprayed onto the filler mixture rather than being added to the mixture as a dry powder. The mixture was then devolatilized at 60 degrees C. in a vacuum oven for 4 hours before the mix was briquetted in the mold in order to prevent bubbling. The sample did not bubble during the post cure. Density was 99% of theoretical. The Chase performance was rated "good".

EXAMPLE VII

APSP Resin Matrix

A sample was fabricated using the same composition and hot pressing cycle as for Example VI except that APSP with low molecular fractions A and B' approximating the relative yields (3B':1A) obtained during APSP work-up was used. As with Exampel VI, the dried mix was devolatilized before pressing. These low molecular weight fractions are more fluid at the cure temperature, resulting in some resin loss during hot pressing and an attained density that was 3.64 g/cc higher than theoretical. This sample did not bubble during postcure. The Chase performance of this sample was rated "very good".

EXAMPLE VIII

APSP Resin Matrix

A sample was prepared as described for Example VI except that the composition was: 6.5% APSP resin, 2.43% graphite, 1.9% carbon black, 42.0% steel wool, 1.0% zirconium silicate, 2.3% talc, 4.5% magnesia, 25.5% iron powder, and 13.9% barytes. The composition had a theoretical density of 87% and a Chase rating of very good.

SUMMARY OF THE EXAMPLES

The Chase results and density of the above examples are summarized in Table II. To obtain theoretical density, sufficient pressure and sufficient resin-forming matrix material must be used. The examples show that for brake linings having the same filler materials, the PSP and APSP resin matrix formulations of the invention have a higher fade temperature and a different coefficient of friction (u). For example, for a given formulation of filler materials, phenolic-resin matrix materials had a u normal of 0.410 and a u hot of 0.379, whereas PSP and APSP resin matrix materials had a u normal of 0.355 and a u hot of 0.350.

TABLE II

| | | \multicolumn{2}{c}{Coefficient of Friction} | \multicolumn{2}{c}{Wear Test} | Temp. of | Chase | Density % of |
|---|---|---|---|---|---|---|---|---|
| Example | Resin | u Normal | u Hot | Inch | Wt. Loss | 2nd Fade | Rating | Theor. |
| I | Phenolic | 0.420 | 0.388 | 0.003 | 1.49% | 625 F | Good | 100 |
| II | Phenolic | 0.403 | 0.370 | 0.0025 | 2.27 | 625 | Good | 100 |
| III | Phenolic | 0.410 | 0.389 | 0.001 | 1.41 | >650 | Poor | 91 |

TABLE II-continued
SUMMARY OF EXAMPLES

| Example | Resin | Coefficient of Friction u Normal | Coefficient of Friction u Hot | Wear Test Inch | Wear Test Wt. Loss | Temp. of 2nd Fade | Chase Rating | Density % of Theor. |
|---|---|---|---|---|---|---|---|---|
| IV | PSP | 0.363 | 0.350 | 0.002 | 3.12 | 600 | Good | >100 |
| V | APSP | 0.353 | 0.343 | 0.001 | 2.28 | 800 | Very Good | 94 |
| VI | APSP | 0.365 | 0.340 | 0.005 | 4.57 | 700 | Good | 99 |
| VII | APSP | 0.378 | 0.353 | 0.001 | 3.57 | 700 | Very Good | >100 |
| VIII | APSP | 0.392 | 0.360 | 0.005 | 3.8 | 600 | Very Good | 87 |

The formulation of filler materials has an important effect on the properties of the friction material. This permits tailoring of the material for specific applications such as drum and disc brake linings for trucks, cars, trains, airplanes, and clutch linings, etc. For example, friction materials for a wide range of applications can be compounded using from 3-16% (by weight) of polystilbazole resin and various combinations of known filler materials. Examples of filler materials include many combinations of materials such as from 10 to 50% metal fibers, 22-68% metal powders, 2-28% carbon, 1-11% ceramic powders, and 0-24% friction modifiers. These and other selections of specific filler-material formulations utilizing both emperical testing and derived relationships is within the scope of the art and within the scope of the invention.

What is claimed is:

1. A friction material comprising:
   3-16% by weight polystilbazole resin; and
   balance filler material.

2. The friction material as claimed in claim 1 wherein said polystilbazole resin is selected from the group consisting of polystyryl pyridine (PSP) and addition curing polystyryl pyridine (APSP).

3. The friction material as claimed in claim 1 wherein said filler material comprises fibrous reinforcement and friction modifiers.

4. A friction material comprising:
   3-16% by weight polystilbazole resin;
   10-50% by weight metal fibers;
   22-68% by weight metal powders;
   2-28% by weight carbon;
   1-11% by weight ceramic powders; and
   0-24% by weight friction modifier.

5. The material as claimed in claim 4 wherein said metal fiber comprises steel fibers.

6. A friction material comprising:
   3-16% by weight of a polystilbazole resin selected from the group consisting of polystyryl pyridine (PSP) and addition curing polystyryl pyridine (APSP);
   10-50% by weight steel fibers;
   22-68% by weight iron powder;
   4-28% by weight of carbon selected from the group consisting of graphite and carbon black;
   1-11% by weight of ceramic powder selected from the group consisting of alumina, zirconium silicate, talc, and magnesia; and
   0-24% barytes.

7. A brake lining comprising:
   6.5-10% by weight addition curing polystyryl pyridine (APSP);
   2-18% by weight graphite;
   0-2% by weight carbon black;
   34-42% by weight steel fibers;
   0-1% by weight zirconium silicate;
   0-3% by weight talc;
   0-5% by weight magnesia;
   22-26% by weight iron powder; and
   12-14% by weight barytes.

8. A friction material comprising:
   3-16% by weight polystilbazole resin, 10-50% by weight steel fiber, and balance metal powders and friction modifiers.

9. The friction material as claimed in claim 8 wherein said polystilbazole resin is selected from the group consisting of polystyryl pyridine (PSP) and addition curing polystyryl pyridine (APSP).

10. A method of fabricating a friction material, comprising the steps of:
    providing 3-16% by weight polystilbazole resin;
    providing the balance filler material;
    mixing said resin and said filler material;
    placing the mixture of resin and filler material in a mold;
    hot pressing said mixture at temperatures which promote flow and cure of said resin and at pressures to provide sufficient density; and
    removing the hot-pressed mixture from said mold.

11. The method as claimed in claim 10, wherein said resin comprises polystyryl pyridine (PSP) and said hot pressing step comprising applying a pressure of approximately 9,000 psi minimum at a temperature of at least 480 degrees F.

12. The method as claimed in claim 10, wherein said resin comprises addition curing polystyryl pyridine (APSP) and said hot pressing step comprises applying a pressure of approximately 9,000 psi minimum while holding at a temperature of approximately 275 degrees F., and then raising the temperature to approximately 350 degrees F., and holding at 350 degrees F. to complete cure of said resin.

* * * * *